United States Patent [19]

Long, Jr.

[11] Patent Number: 5,374,174

[45] Date of Patent: Dec. 20, 1994

[54] APPARATUS FOR/INSTALLING A LINER WITHIN A SERVICE PIPE OR THE LIKE

[75] Inventor: Charles A. Long, Jr., Birmingham, Ala.

[73] Assignee: Insituform (Netherlands) B.V., Netherlands

[21] Appl. No.: 62,140

[22] Filed: May 17, 1993

[51] Int. Cl.⁵ .............................................. B29C 63/36
[52] U.S. Cl. ................................. 425/11; 156/287; 156/294; 156/423; 405/154; 425/62; 425/501; 425/503; 425/508
[58] Field of Search .................. 425/122, 11, 182, 501, 425/14, 503, 508, 62; 156/287, 294, 423; 405/154, 174, 178, 184

[56] References Cited

U.S. PATENT DOCUMENTS

| 3,301,736 | 1/1967 | Smith | 156/287 X |
|---|---|---|---|
| 4,009,063 | 2/1977 | Wood | 156/294 X |
| 4,064,211 | 12/1977 | Wood | 156/287 X |
| 4,135,958 | 1/1979 | Wood | 156/294 X |
| 4,434,115 | 2/1984 | Chick | 156/287 X |
| 4,640,313 | 2/1987 | Stanley | 156/287 X |
| 4,668,125 | 5/1987 | Long, Jr. | 156/294 X |
| 4,685,983 | 8/1987 | Long, Jr. | 264/510 X |
| 4,950,446 | 8/1990 | Kinumoto et al. | 156/287 X |
| 4,956,041 | 9/1990 | Miyazaki et al. | 156/287 X |
| 4,980,116 | 12/1990 | Driver | 156/294 X |
| 4,997,502 | 3/1991 | Schnaars | 156/294 X |
| 5,108,533 | 4/1992 | Long, Jr. et al. | 156/294 |
| 5,154,936 | 10/1992 | Driver et al. | 425/182 |
| 5,200,011 | 4/1993 | Imamura et al. | 156/287 X |
| 5,213,727 | 5/1993 | Gargiulo | 156/287 X |

FOREIGN PATENT DOCUMENTS

WO92/14961  9/1992  WIPO.

Primary Examiner—Richard L. Chiesa
Attorney, Agent, or Firm—James & Franklin

[57] ABSTRACT

An improved apparatus particularly well adapted for installing a liner within a service pipe having an access end and a terminal end, the liner having a part which is everted and then inflated by the insertion of a fluid thereinto, the fluid being thus inserted by way of a conduit movable into the everted liner part by sliding through the eversion apparatus, the apparatus being further provided with appropriately located winches for controlling the movement of that part into and out of the service pipe.

14 Claims, 4 Drawing Sheets

APPARATUS FOR INSTALLING A LINER WITHIN A SERVICE PIPE OR THE LIKE

The present invention relates generally to apparatus for the installation of a liner within the interior of a conduit or pipe, such as a sewer pipe, and more particularly for installing a liner within a service pipe connected to a main pipe.

BACKGROUND OF THE INVENTION

It is generally well known that conduits or pipes, particularly underground pipes, which are employed for conducting fluids, for example, sanitary sewer pipes, storm sewer pipes, water lines and gas lines, frequently require repair due to fluid leakage. The leakage may be inwardly, from the environment into the interior or conducting part of the pipe, or outwardly, from the conducting part of the pipe into the surrounding environment. Leakage of this type may be due to improper initial installation of the pipe, deterioration of the pipe itself due to normal aging or the effects of conveying corrosive or abrasive materials, cracking of the pipe or pipe joints due to environmental conditions, such as earthquakes, the movement of large vehicles or similar natural or man-made vibrations, or any other such causes. Regardless of the cause, such leakage is undesirable, at best, and may result in waste of the fluid being conveyed by the pipe, damage to the surrounding environment and the possible creation of dangerous public health hazards.

Because of ever increasing labor and machinery costs, it is becoming increasingly more difficult, at least economically, to dig up and replace underground pipes or portions or sections of such underground pipes which may be leaking. As a result, various methods have been devised for the in situ repair or rehabilitation of existing pipes, thereby avoiding the expense and hazards associated with digging up and replacing the pipes or pipe sections.

One of the more successful pipe repair or rehabilitation processes which is currently used is called the Insituform Process and is described in U.S. Pat. No. 4,009,063, Wood; U.S. Pat. No. 4,064,211, Wood, and U.S. Pat. No. 4,135,958, Wood, the contents of which are incorporated herein by reference. It involves the use of an elongated flexible tubular liner comprised of a felt fabric or foam or similar flexible material which has been impregnated with a thermosetting synthetic catalyzed resin, which is installed within the existing pipe utilizing an inverting or everting process, as is known to those skilled in the art. Once the flexible liner is installed in place within the pipe, the liner is pressurized from within, preferably utilizing a fluid such as water, to force the liner radially outwardly to engage and conform to the interior surface of the pipe and to force some of the impregnated resin into any cracks or interstices within the walls of the pipe. The resin is then cured to form a relatively hard, tight fitting, rigid pipe lining which effectively seals any cracks and repairs any pipe or pipe joint deterioration to prevent further leakage either into or out of the pipe. The cured resin liner also serves to strengthen the existing pipe walls to provide added structural support for the surrounding overburden. The apparatus of the present invention and its manner of use will be here described in connection with the installation of a liner of the above type, but it will be appreciated that that is by way of exemplification only.

Many pipes to be relined have leading and trailing ends which are directly or easily accessible. However, other pipes have only one end directly or easily accessible, and it is to the lining of this latter type of pipe that the instant invention is particularly directed. Typical of such one-end accessible pipes are service pipes associated with main sewage pipes. Typically, the main sewer pipe is in fluid communication with each house or building in the residential or commercial area for receiving sewage therefrom and transporting the sewage to a treatment center. A service pipe is transversely connected to the main pipe and provides the means for transporting the sewage to the main pipe, as is understood by those skilled in the art.

There presently exists a need for an effective and economical way to reconstruct service pipes which extend between commercial or residential buildings and a main sewer pipe. My prior U.S. Pat. No. 5,108,533 of Apr. 28, 1992, entitled "Method and Combination For Installing a Liner Within a Service Pipe Transversely Connected to a Main Pipe", the contents of which are here incorporated by reference, is directed to just such a relining of a service pipe. The present invention in its more specific aspects constitutes an improvement over what is disclosed in that patent.

More specifically, the apparatus here disclosed and claimed comprises a structure readily movable to its place of use and which comprises, in an efficient and self-contained manner, the apparatus necessary to form a liner of a type suitable for insertion into a service pipe, to move that liner into position in the service pipe and to supply to that liner, in an effective and functionally flexible manner, the fluids appropriate to inflate the liner both before and after it has been inserted, and then to withdraw from the liner all of those elements which are not to remain in that service pipe. Thus the apparatus includes winch means for controlling the movement of the elements, and particularly the evertable elements, which participate in liner formation and insertion, and it also includes conduit means associated with the tube eversion portion of the apparatus for supplying fluid to the remote end of the lining tube after the tube is in place, thereby to facilitate the curing of the impregnating resin. The conduit means may be moved to a withdrawn position, where it does not interfere with the eversion of a liner element when that eversion is taking place, but is thereafter movable along the length of the everted element substantially to said remote end thereof, after which fluid is supplied to the interior of the everted element via the leading end of that conduit means.

It is the prime object of the present invention to devise an apparatus which transports to the point of use a maximum amount of the equipment needed to install a liner within a conduit, especially a service pipe.

It is a further object of the present invention to devise such an apparatus having improved means for supplying fluid to the interior of the liner assembly, which fluid-supplying means may be readily controlled and adapted to perform specifically different functions as required, and to facilitate simultaneous lining operations at different locations.

It is yet another object of the present invention to devise an apparatus for everting a tube which also has mounted thereon or directly associated therewith such auxiliary equipment as is appropriate for the carrying out of tube formation and insertion in an efficient, effective and flexible manner.

BRIEF DESCRIPTION OF THE DRAWINGS

To the accomplishment of the above, and to such other objects as may hereinafter appear, the present invention relates to the structure of a liner-forming-and-installing apparatus as defined in the appended claims and as described in this specification, taken together with the accompanying drawings in which:

DESCRIPTION OF PREFERRED EMBODIMENT

Figure 3:
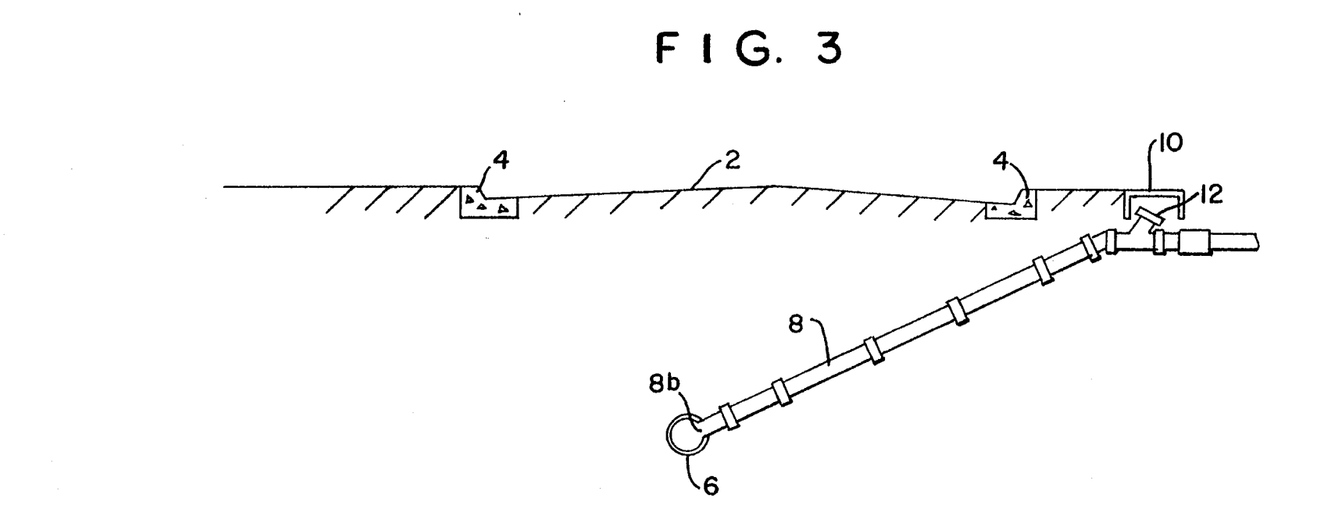
FIG. 3 is a diagrammatic view of a typical main sewer line and service pipe connection.

As has been mentioned, the apparatus of the present invention is particularly well adapted for use in connection with the insertion of a liner into a pipe only one end of which is directly or easily accessible, such as a service pipe functioning to conduct waste from a house or building to a sewer pipe, and the use of the apparatus of the present invention, generally designated A, will be here described as used in that manner. FIG. 3 discloses a typical environment for the use of this apparatus A, that environment comprising a standard street 2 including a roadside curb 4. Beneath the street is a main sewer pipe 6 to which a service pipe 8 communicates, the upper end of that pipe 8 being provided with a clean-out structure 10 accessible at street level beneath which an access pipe 12 is located which communicates with the service pipe 8 and is accessible at its upper end when the clean-out structure 10 is used. Thus the service pipe 8 has an accessible end 8a defined by the access pipe 12 and a remote terminal end 8b which communicates with the main pipe 6 and is not readily accessible.

Figure 2:
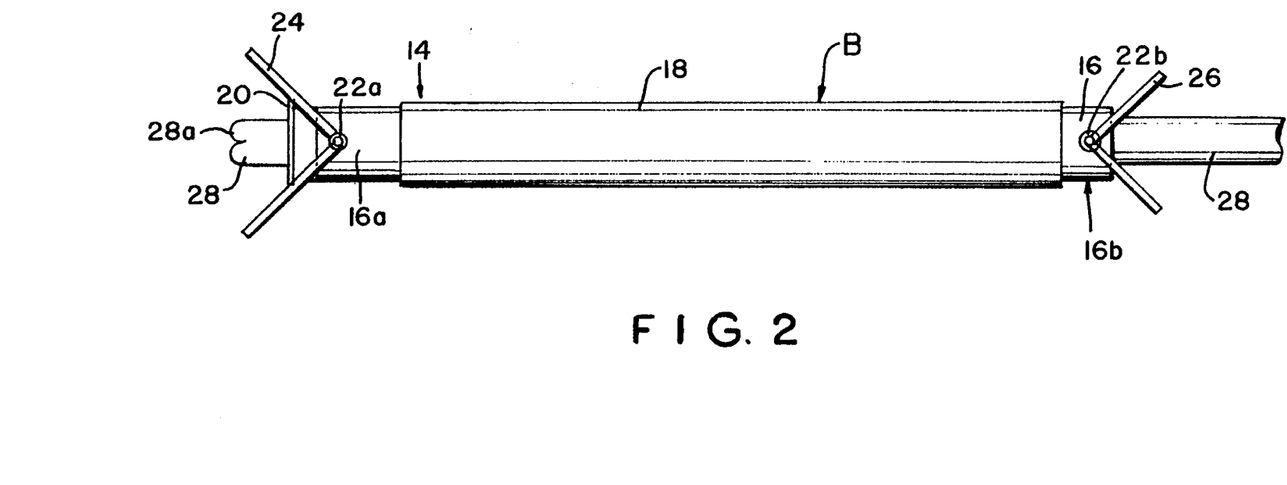
FIG. 2 is a top plan view of a typical service tube assembly.

FIG. 2 discloses a preferred embodiment of a service tube assembly generally designated B, which is of the type disclosed in my U.S. Pat. No. 5,108,533. As there described more in detail, it comprises a liner assembly generally designated 14 made up of a lining tube 16 which may be formed of resin-impregnated felt and which optionally may be received within a polymer sleeve 18 somewhat shorter than the tube 16 so that portions of the tube 16 extend out axially from the ends of the sleeve 18. The leading end 16a of the tube 16 carries a flexible retainer 20 which when expanded is designed to seat within the sewer pipe 6 at the remote end 8b of the lateral pipe 8, as shown schematically in FIG. 3 and shown more in detail in FIGS. 9 and 10 of my '533 patent. Grommets 22a and 22b are secured respectively to the leading and trailing ends 16a and 16b of the tube 16. A pull-forward rope or cable 24 is removably threaded through the grommet 22a and a pull-back rope or cable 26 is removably threaded through grommet 22b, all as is well known in the industry and is described more in detail in my '533 patent.

In the preferred embodiment, the tube 16 is preferably formed of felt impregnated with a thermosetting resin which cures after the tube 16 is positioned within the service pipe 8. The service tube assembly B also comprises, for forcing the tube 16 radially outwardly into engagement with the service pipe 8 and for aiding in the curing of the impregnated resin, an everted flexible tubular conduit 28, which may be constituted by a conventional lay-flat hose, positioned within the tube 16. The conduit 28 will for purposes of ready explanation be referred to as a "hose".

Figure 1:
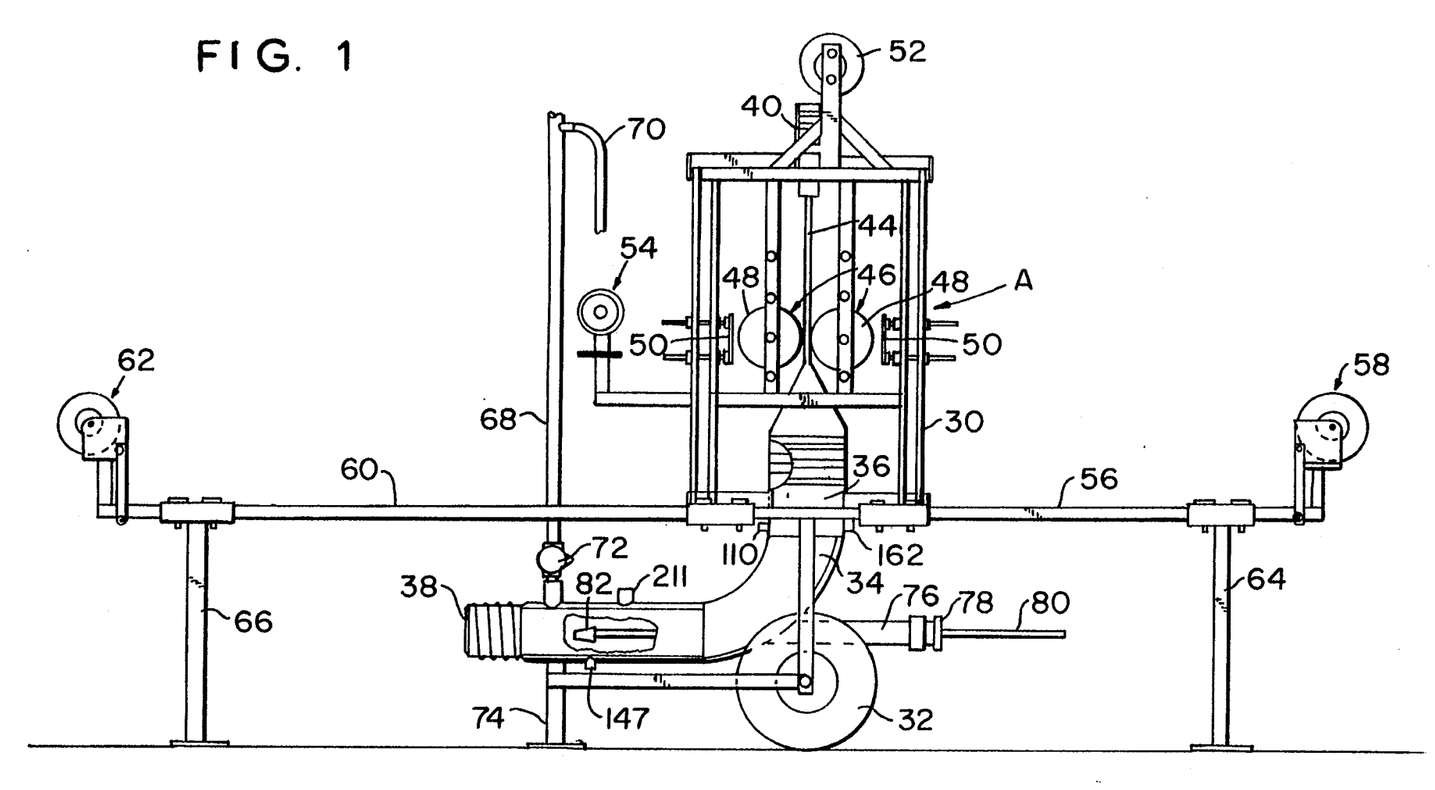
FIG. 1 is a side elevational view, partially broken away, of a transportable liner eversion and installation apparatus in accordance with the present invention.

Turning now to FIG. 1, which discloses the apparatus A designed to produce the service tube assembly B and manipulate and install it as required, that apparatus comprises a framework 30 supported on wheels 32 so that it can be moved from one location to another. Mounted in an above-ground position on and beneath the framework 30 is a curved tube 34 extending between a vertical cylinder 36 on the framework 30 and an open horizontally disposed end 38. At the top of the framework 30 and above the cylinder 36 is a rounded end slot forming tubular element 40 that permits hose 28 to pass through in its lay-flat form. Sealingly secured to and communicating between the cylinder 36 and tubular element 40 is a flexible curtain means 44, preferably in the form of a tubular fabric, the upper end of which is turned over and sealed to the lower open end of the tubular element 40 and the lower end of which is slid over and sealed to the upper open end of the cylinder 36. The curtain means 44 may be formed of the same material as the lay-flat hose. The interior of the curtain means 44 is preferably internally coated with a low-friction material such as polyurethane so as to facilitate the sliding of an element such as the hose 28 therethrough, and it may also be externally coated with a similar material in order to enhance its strength and reliability.

Also mounted on the framework 30 is valving means generally designated 46 designed to prevent pressure from escaping from the cylinder 36 while permitting the hose 28 to slide therethrough. The valving 46 is of the type disclosed in my co-pending application Ser. No. 08/054,307, filed Apr. 30, 1993 entitled "Apparatus For Everting a Tube", and, as there disclosed more in detail, comprises a pair of flexible bladders 47 (see FIGS. 4 and 5), one on each side of the curtain means 44 and extending horizontally between and sealed to bladder holders 48, the two bladders being formed of conventional lay-flat hose material comparable to that forming the curtain means 44. Mounted on the framework 30 outside each of the bladders 47 are brackets 50 adjustably positionable on the framework 30 so as to be movable toward and away from their respective associated bladders 47, thereby to cause the bladders 47, when inflated, to press against the curtain means 44 and press that curtain means into engagement with the element such as the hose 28 sliding down through it, thereby to produce a fluid seal while permitting that sliding movement to continue. The tubular element 40 has an open top and mounted on the framework 30 above that open top is a rotatable guide roller 52. Also mounted on the framework 30 is a control manifold assembly 54 having two separate sections 54a and 54b, for water and air respectively.

Mounted on the framework 30 and extending to the right as viewed in FIG. 1 are outriggers 56 which carry, at a point spaced from the framework 30, a winch generally designated 58. The left-hand side of the framework 30 has outriggers 60 which carry winch 62, and struts 64 and 66 extend downwardly from the outriggers 56 and 60 respectively in order to support them above the ground when the apparatus A is appropriately located. The winches 58 and 62 may be controlled either manually or by electric or other power.

The tube 34, adjacent its open end 38, has vertical pipe 68 communicating therewith and extending up therefrom to an overflow hose 70, valve 72 being interposed in the pipe line 68. Support for the forwardly extending end of the tube 34 may be provided by strut 74.

Extending to the right from and communicating with the lower horizontal portion of the tube 34 is a pipe 76 having a gland 78 at its end. Sealingly slidable through the gland 78 is an insertion conduit 80 of appreciable length the leading end of which, inside the pipe 76 and tube 34, carries a nozzle 82, visible in FIG. 1 through a broken-away portion of the tube 34. The size of the nozzle 82 is such that it cannot pass through the gland 78, thus retaining the leading end of the conduit 80 within the tube 34 and pipe 76 at all times. The nozzle 82 preferably is designed to have fluid flow out therefrom generally radially with respect to the axis of conduit 80 and generally uniformly distributed circumferentially, and the leading portion of conduit 80 may also have flow apertures formed therein.

Figure 4:
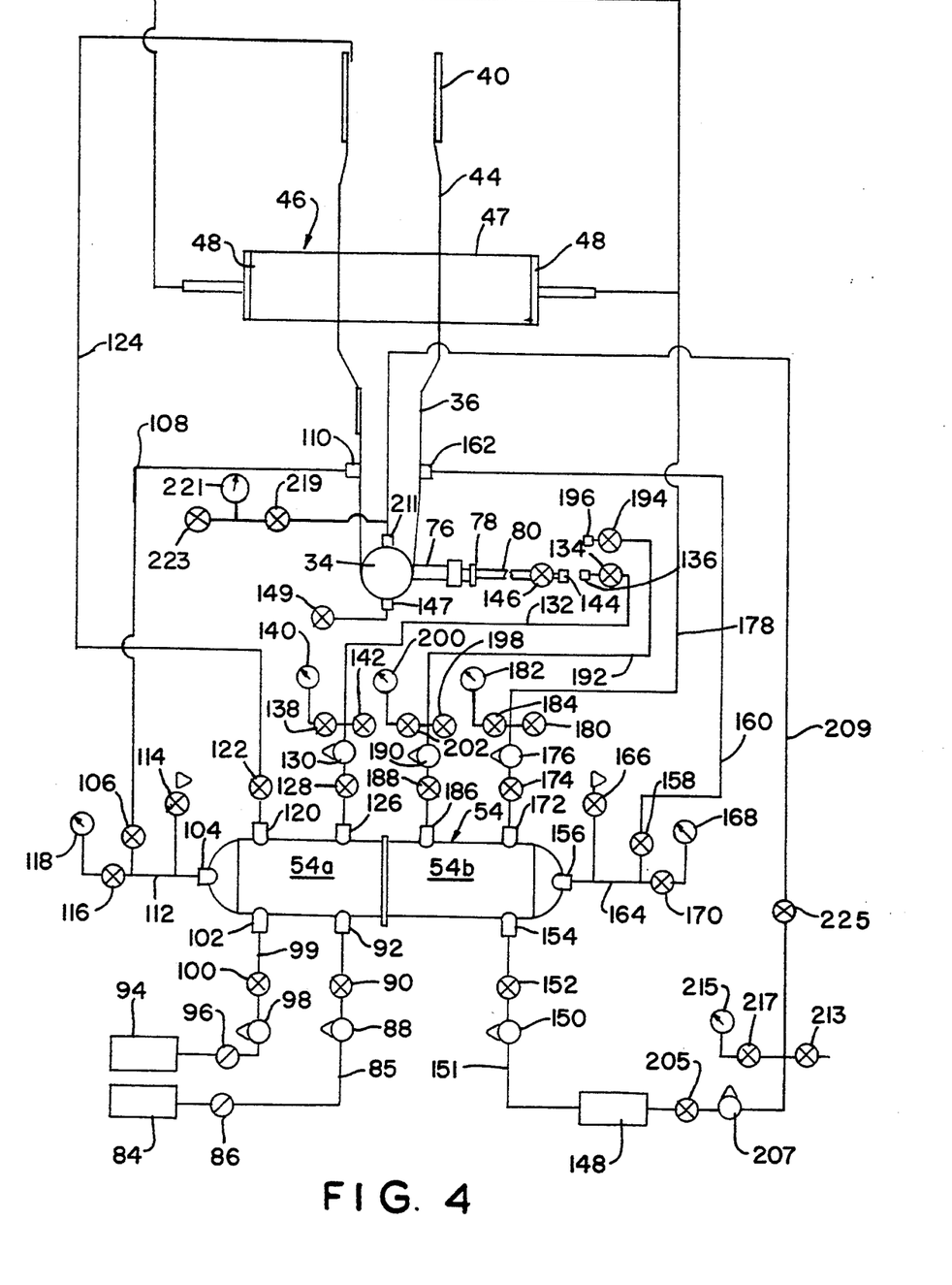
FIG. 4 is a diagrammatic representation of the piping, valves, hose and hose fittings involved in the use of the disclosed apparatus.

FIG. 4 discloses one way in which the apparatus of the present invention can be connected to the sources of both air and water to perform its desired function. A pressurized hot water source 84 is connected by line 85, check valve 86, water pressure regulating valve 88 and water valve 90 to an inlet 92 to the water section 54a of the manifold assembly 54. A pressurized cold water source 94 is connected by line 99, check valve 96, water pressure regulating valve 98 and water valve 100 to inlet 102 to the manifold section 54a. One outlet 104 from the manifold section 54a is connected by water valve 106 and line 108 to inlet 110 leading into the cylinder 36. Line 112 communicating between outlet 104 and water valve 106 also communicates with water pressure relief valve 114 and, via water valve 116, to water pressure gauge 118. Outlet 120 from the water manifold section 54a is connected by water valve 122 and line 124 to the interior of the tubular element 40. Outlet 126 from the water manifold section 54a is connected by water valve 128 and pressure regulating valve 130 to line 132, water valve 134 and male quick coupling element 136. Communicating with line 132 via water valve 138 is water pressure gauge 140, and also communicating with line 132 is water waste valve 142. The conduit 80 which slides through the gland 78 has at its end exterior to the gland 78 a female quick coupling element 144 designed to mate with the male quick coupling element 136. A water valve 146 is located between the quick coupling element 144 and the remainder of the conduit 80. Drain outlet 147 from cylinder 36 exhausts through water waste valve 149.

Pressurized air source 148 is connected by line 151, air pressure regulating valve 150 and air valve 152 to inlet 154 to the air manifold portion 54b. Outlet 156 from that air manifold portion 54b is connected by air valve 158 and line 160 to inlet 162 to the cylinder 36. Communicating with the line 164 between outlet 156 and air valve 158 is air pressure relief valve 166 as well as air pressure gauge 168 connected to the line 164 via air valve 170. Outlet 172 from the air manifold portion 54b is connected via air valve 174, air pressure regulating valve 176 and line 178 to the interiors of the sealing bladders 47. Communicating with the line 178 is an air waste valve 180 and an air pressure gauge 182 connected to the line 178 via air valve 184.

Outlet 186 from the air manifold portion 54b is connected via air valve 188, air pressure regulating valve 190 and line 192, via air valve 194, to a male quick coupling element 196 designed to mate with the female quick coupling element 144. Communicating with the line 192 is an air waste valve 198 and an air pressure gauge 200 connected to the line 192 by air valve 202. Pressurized air source 148 is connected by air valve 205 and air pressure regulating valve 207 through line 209 to inlet 211 of curved tube 34. Communicating with line 209 is air waste valve 213 and air pressure gauge 215 connected to line 209 via air valve 217. Also communicating with line 209 is air valve 219, air pressure gauge 221, air waste valve 223 and quick acting air valve 225.

Figure 5:
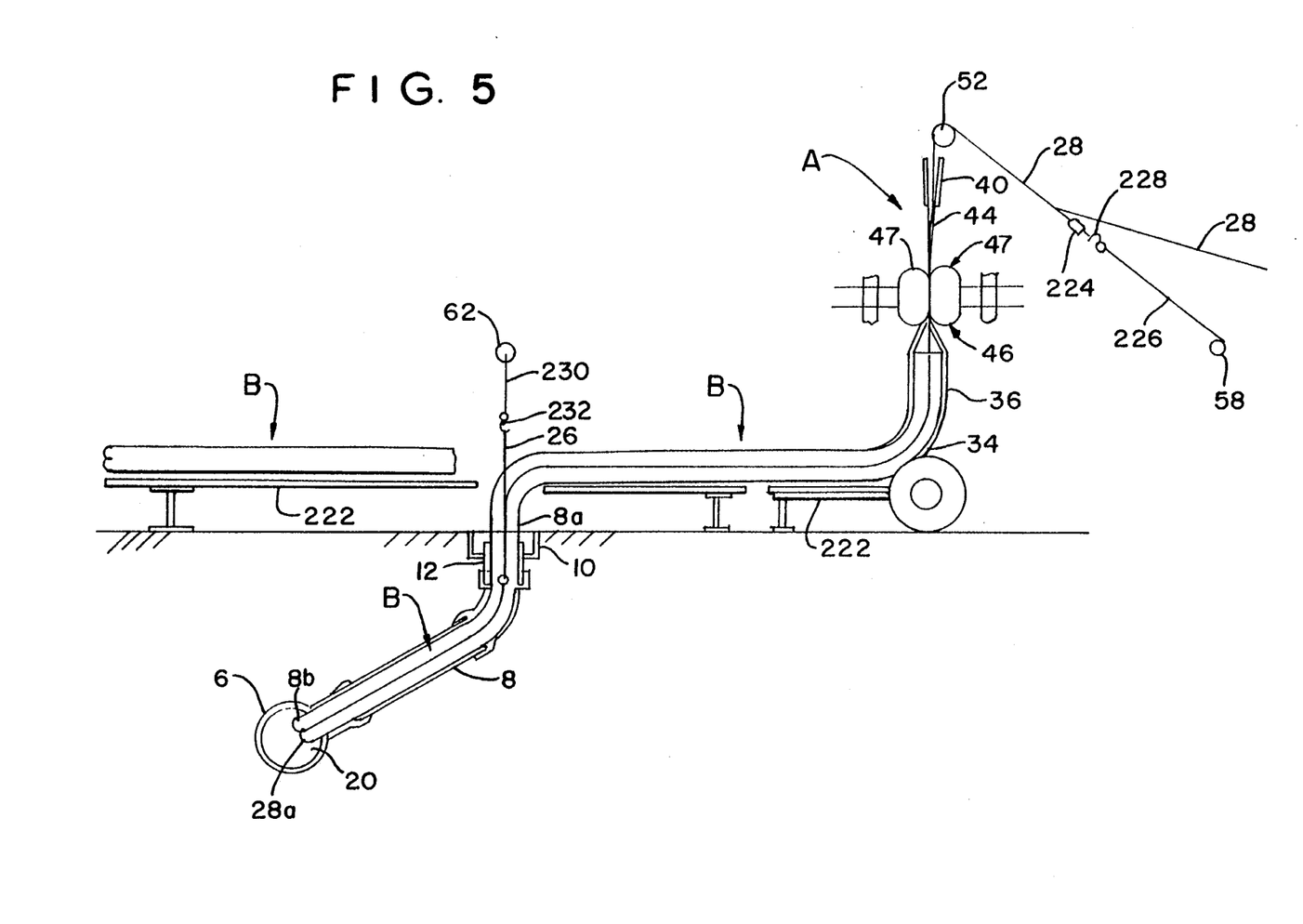
FIG. 5 is a diagrammatic representation illustrating one manner in which the apparatus may be used.

FIG. 5 illustrates schematically one way in which the apparatus A of the present invention can be used. The apparatus A is moved to a position in which the winch 62 is located above the access pipe 12 of the clean-out structure 10. To facilitate this the outriggers 56 and 60 carrying winches 58 and 62 respectively may be removable from the apparatus A, to be attached thereto and supported only after that apparatus A has been moved into position. Next an elongated temporary work platform 222 (see FIG. 5), which may consist of a framework over which a felt sheet may be placed, is placed in position closely adjacent to the apparatus A and extending forwardly (to the left as viewed in the figures) from the open end 38 of the tube 34. That platform may be tilted downwardly to the right as viewed in FIG. 5 to facilitate subsequent drainage of fluid from the service tube assembly B. The lining tube 16, with its sleeve 18 when provided, after having been cut to a length corresponding to that of the service tube 8 to be lined, is placed on that work support 222. Then, with the bladders 47 uninflated and relaxed, the hose 28 is passed over guide roller 52, down through the tubular element 40 and the curtain means 44 into and through the cylinder 36 and the tube 34 until the then leading end of that hose 28 extends out beyond the open end 38 of the tube 34. That leading end of the hose 28 is then cuffed back over the end of the tube 34 and sealed thereto, as through the use of external locking bands (not shown).

Eversion of hose 28 through lining tube 16 then takes place. All valves are closed. Pressurized air source 148 provides pressurized air at approximately 100 psi. Air valves 152 and 170 are opened and the components of line 151 are adjusted until approximately 20 psi of air pressure is applied to the air section 54b of control manifold assembly 54. Air relief valve 166 is set at approximately 30 psi of air pressure. Air valves 174 and 184 are opened and the components of line 178 are adjusted until approximately 10 psi of air pressure is placed on the pair of flexible bladders 47. The pair of flexible bladders 47 are thus inflated. Brackets 50 are mechanically adjusted to move the pair of flexible bladders 47 inwardly and horizontally to press against the outer surface of flexible curtain means 44 causing the inner surface of flexible curtain means to press against hose 28. Valving means 46 is then active.

Pressurized cold water source 94 provides pressurized cold water at approximately 60 psi. Water valves 100 and 116 are opened and the components of line 99 are adjusted until approximately 20 psi of cold water pressure is applied to the water section 54a of control manifold assembly 54. Water pressure relief valve 114 is set at approximately 30 psi of water pressure. Water valve 106 is opened, applying approximately 20 psi of cold water pressure to vertical cylinder 36 and tube 28 below valving means 46, thus applying pressure to the everting end 28a of hose 28. Water valve 122 is opened until tubular element 40 and flexible curtain means 44 are filled with cold water. Vegetable oil may be added to tubular element 40 from time to time to provide additional lubrication to assist hose 28 in sliding through flexible curtain means 44.

Boosting air pressure is now applied to the everting end 28a of hose 28 by opening air valves 205 and 217 and adjusting the components of line 209 until air pressure gauge 215 indicates approximately 60 psi of air pressure. Quick acting air valve 225 is opened intermittently causing the everting end 28a of hose 28 to evert until it reaches the trailing end 16b of the lining tube 16. Quick acting air valve 225 is closed, thereby stopping the eversion of hose 28. Water valves 106 and 122 are closed and waste water valve 149 is opened, allowing hose 28 to deflate.

The trailing end 16b of lining tube 16 is placed over the everted end 28a of hose 28. Waste water valve 149 is closed and water valve 106 is opened. Quick acting air valve 225 is opened intermittently, causing hose 28 to evert inside and down through liner tube 16 until the everting end 28a has extended approximately 6 inches beyond flexible retainer 20, as shown in FIG. 2. Water valve 122 is opened intermittently to provide water seal and lubrication during the eversion process while hose 28 passes over rotatable guide roller 52 and slides through flexible curtain means 44, through the inside of the previously placed tube 28 to the everting end. Water valves 106 and 122 and quick acting air valve 225 are closed. Waste water valve 149 is opened, allowing water and air to drain from the everted hose 28. The draining of hose 28 is assisted by the inclination of hose 28 on the work platform 222. Insertion conduit 80 is manually pushed through gland 78 until nozzle 82 is approximately 6 inches from the everted end 28a of tube 28. Marking tape (not shown) is applied to insertion conduit 80 at the end of gland 78. Insertion conduit 80 is then manually pulled out of tube 28 until nozzle 82 reaches the inside port of gland 78.

Before eversion of the hose 28 through the tube 16 is started, pull clamp 224 is attached to hose 28 at an appropriate point along its length. Cable 226 is attached to pull clamp 224 by means of hook 228. Cable 226 extends from that pull clamp 224 to the winch 58 on which it is wound. After the leading everted end 28a of the hose 28 has been inserted into the right-hand end of the tube 16 and eversion of the hose 28 proceeds, the winch 58 may be used to control the progress of that eversion.

The drained assembly B is now ready to be inserted into the service pipe 8. A rope (not shown) is passed through access pipe 12 and service pipe 8 and along sewer pipe 6 to and out of a downstream manhole (not shown). The trailing end of that rope is attached to the pull-forward rope 24 of the assembly B. Those ropes are then pulled forward from the downstream manhole while the assembly B is removed from the temporary work support 222, and the leading end of the assembly B, to which the pull-forward rope 24 is attached, is drawn through the service pipe 8 into the sewer pipe 6. A TV camera is located in the sewer pipe 6, and when it reveals that the flexible retainer 20 has entered the sewer pipe 6 and projects somewhat beyond the remote end 8b of the service pipe 8 the ropes pulling the assembly B forward are relaxed and the pull-forward rope 24 is disengaged from the assembly B.

Next the flexible retainer 20 is engaged with the remote end 8b of service pipe 8 inside the sewer pipe 6. To accomplish that the trailing end of pull-back rope 26 is attached, via hook 232 (see FIG. 5), to cable 230 wound on winch 62. The air system male quick coupling element 196 is connected to the female element 144. Air valves 188 and 202 are opened and the components of line 192 are adjusted until approximately 8 psi of air pressure is indicated on air gauge 200. Air valves 194 and 146 are opened, thus applying air under pressure through the conduit 80 to the interior of the hose 28, keeping the entire service tube assembly B inflated. Air valve 219 is opened and the approximate 8 psi of air pressure is monitored on air pressure gauge 221. Additional air pressure from line 209 is available by opening quick acting air valve 225 to maintain approximately 8 psi of air pressure on hose 28. Cable 230 is attached to hook 232 which is attached to pull-back rope 26 of service tube assembly B. The cable 230 is then wound onto the winch 62, pulling the entire service tube assembly B back until the flexible retainer 20, extended by virtue of the inflating of the service tube assembly B, seats against the inside surface of the sewer pipe 6 around the remote end 8b of the service pipe 8. The pull-back rope 26 can then be disengaged from the grommet 22b.

Next cold water is supplied to the water manifold section 54a, valves 106 and 122 are opened and cold water fills the cylinder 36, the tubular element 40 and the curtain means 44. Valve 72 (see FIG. 1) is opened and water is allowed to flow out of pipe 68 and hose 70. The hose 28 will remain inflated by the static pressure that is exerted by the column of water in the pipe 68. Conduit 80 is manually pushed into hose 28 until the previously attached marking tape (not shown) reaches gland 78.

Next the valving means 46 is deflated, the air male quick coupling element 196 is disengaged from the female element 144 and the water quick coupling male element 136 is connected thereto. Water valves 128 and 138 are opened and the components of line 132 are adjusted until water pressure gauge 140 indicates approximately 8 psi of water pressure. Valve 134 is opened, thereby to provide cold water which moves along the conduit 80, goes out through its nozzle 82, flows back along the length of the hose 28 and out through the pipe 68 and hose 70, the hose 28 remaining inflated by reason of the static pressure exerted by the water in pipe 68.

In some instances the leading end of the hose 28 extending into the sewer pipe 6 (see FIG. 5) may prevent the TV camera from being moved to its next point of use, where a second apparatus A may already be in position. Since curing of the impregnating resin usually takes an appreciable period of time, to incapacitate the TV camera for that period of time, preventing lining the next adjacent service pipe 8, is very uneconomic. The fact that the hose 28 is at this point kept inflated only by virtue of the water in the height of the pipe 68 permits the assembly B to be temporarily pulled back while it remains inflated, thereby to enable the TV camera to pass by, and then to be moved back to its initial position. This may be accomplished by noting the position of the hook 228 with respect to the winch 58, and causing that winch 58 to reel up a portion of the cable 226 which is attached to pull clamp 224 and hose 28 by means of hook 228, thus pulling back on the hose 28 relative to the lining tube 16, which can readily be done against the action of the minimal inflating pressure then active. After the TV camera has been moved past the service pipe 8 toward its new work location, hose 28 is re-everted and the cable 226 is unwound from the winch 58 until the hook 228 reaches its pre-noted distance from the winch 58, the hose 28 thus re-everting until its leading end 28a has returned to its original position.

The service tube liner assembly B is now in condition to cure the resin which impregnates the tube 16. To that end the water manifold section 54a is supplied with hot water by closing valve 100, opening valve 90, and adjusting the components of line 85 until approximately 20 psi of hot water pressure is applied to the water section 54a of control manifold assembly 54. Opening water valves 134 and 146 ensures that hot water is supplied under pressure through valve 128, line 132, water valve 134, valve 146 and previously connected female quick connection element 136 to the conduit 80. The hot water flows through the conduit 80 to its nozzle 82 which is located near the leading end of the hose 28, it exits from that nozzle 82, and from the leading portion of the conduit 80 itself substantially uniformly circumferentially thereto, it flows back along the length of the hose 28, and escapes through the pipe 68 and tube 70. The vertical column of hot water in the pipe 68 keeps the hose 28 inflated and thus pushes the resin-impregnated tube 16 into engagement with the inner surface of the service pipe 8 and causes the impregnating resin to cure. The fact that the hot water initially contacts the interior of the hose 28 adjacent its leading end, which is ensured by virtue of the conduit 80 which has been positioned to extend along substantially the entire length of the everted hose 28, facilitates prompt and effective cure of the impregnating resin.

After thermocuring of the resin has been completed the supply of hot water is cut off and inserted tube liner assembly B is permitted to cool. Conduit 80 is withdrawn to a position in which its nozzle 82 is out of the curved tube 34 and within the tube 76. Valve 149 is opened, permitting the interior of the cylinder 36 to drain. Winch 58 is then utilized to withdraw hose 28 from tube 16. This may be accomplished in several steps by disengaging pull clamp 224 and hook 228 from hose 28 when the pull clamp 224 and hook 228 come too close to winch 58 and then re-attaching the pull clamp 224 and hook 228 to the hose 28 at a new position remote from the winch. During this procedure excess water will drain out through the valve 149. Through this means hose 28 has been de-everted and withdrawn from the cured-in-place lining tube 16.

From the above it will be seen that the apparatus here disclosed contains substantially all of the equipment needed for the effective and efficient relining of a pipe only one end of which is readily accessible, which apparatus permits quick and flexible control of the various relatively complicated steps involved in forming the lining assembly, inserting the assembly into the pipe to be lined, subjecting the pipe assembly to conditions conducive to setting of an impregnating resin when present, and then removing portions of that lining assembly for re-use while leaving the cured lining in position. Rapid and easily achieved changes between air and water as the inflating fluids greatly facilitate the insertion operation both insofar as insertion per se is concerned and insofar as removing instructions to the supervising TV camera in the sewer pipe are concerned, so that the camera can be moved to a new location whenever desired and independently of the time that is involved in carrying out the setting of the resin at the initial location. Resin setting is particularly enhanced by enabling the heating water which produces that setting to enter the liner assembly at its remote end, this being accomplished by providing the movable insertion conduit 80 which is initially located so that it does not interfere with eversion, which can be inserted into the hose 28 after it has been everted and which can later be withdrawn to permit that hose to be re-everted and removed from the cured liner. The apparatus not only provides a suitable everting means, but also carries winches which are effective to control eversion and to withdraw various elements of the lining assembly at appropriate times.

It will be understood that the single embodiment of the present invention here disclosed and the air and water pressures and specific sequence of operational steps here set forth are exemplary only, relate to a particular preferred procedure and structure adapted to a given installation, and that many variations may be made therein, all within the scope of the present invention as defined in the following claims.

I claim:

1. In an apparatus for everting a tube comprising a pressure chamber having an outlet, the tube to be everted being adapted to pass from said chamber to said chamber outlet with an end secured to said chamber outlet, whereby pressure in said chamber acts on said tube to evert it in a direction out from said chamber outlet, the improvement which comprises said chamber having an opening, a conduit for conveying fluid having a fluid outlet at its leading end and movable through said opening between a first position in which said conduit fluid outlet is located adjacent said opening and a second position in which said conduit fluid outlet is located within the everted portion of said tube relatively remote from said opening, means for producing a sliding seal between said opening and said conduit, and means for supplying fluid to said conduit.

2. The apparatus of claim 1, in which said conduit fluid outlet comprises a nozzle effective to distribute around the axis of said conduit the fluid which escapes therefrom.

3. The apparatus of either of claims 1 or 2, in which in said second position said conduit fluid outlet is located close to the end of said everted tube.

4. The apparatus of either of claims 1 or 2, in which said chamber comprises first and second angularly related portions with said second portion leading to said chamber outlet, said chamber opening being substantially in line with said second chamber portion, the axis of said conduit being substantially in line with said second chamber portion.

5. The apparatus of claim 4, in which in said second position said conduit fluid outlet is located close to the end of said everted tube.

6. The apparatus of either of claims 1 or 2, in which said chamber comprises first and second angularly related portions with said second portion leading to said chamber outlet and said chamber outlet being at the end of said second position, said chamber opening being substantially in line with said second chamber portion, the axis of said conduit being substantially in line with said second chamber portion and the axis of said everted tube.

7. The apparatus of claim 6, in which in said second position said conduit fluid outlet is located close to the end of said everted tube.

8. Apparatus for lining a conduit with a tube from one end of said conduit comprising a support adapted to be located at said conduit end, an elongated work-supporting surface operatively connected to said support, first and second winches operatively connected to said support and spaced from one another, tube everting apparatus mounted on said support, said tube everting apparatus comprising a tube outlet extending toward said work-supporting surface to which an end of said tube to be everted is adapted to be secured, a pull-back rope adapted to be secured to the everted end of said tube being wound on said first winch and a removable second tube adapted to be located temporarily within said first-mentioned tube being wound on said second winch, all of said apparatus being operatively connected to one another so as to be located at said conduit end.

9. Apparatus for lining a conduit with a tube from one end of said conduit comprising a support adapted to be located at said conduit end, an elongated work-supporting surface operatively connected to said support, first and second winches operatively connected to said support and spaced from one another in the direction of elongation of said surface, tube everting apparatus mounted on said support and located between said winches, said tube everting apparatus comprising a tube outlet extending toward said work-supporting surface to which an end of said tube to be everted is adapted to be secured, a pull-back rope adapted to be secured to the everted end of said tube being wound on said first winch and a removable second tube adapted to be located temporarily within said first-mentioned tube being wound on said second winch, all of said apparatus being operatively connected to one another so as to be located at said conduit end.

10. In the apparatus of either of claims 8 or 9, said tube everting apparatus comprising a pressure chamber, an outlet, said tube being adapted to pass from said chamber to said chamber outlet with an end secured to said chamber outlet, said chamber having an opening, a conduit for conveying fluid having a fluid outlet at its leading end and movable through said opening between a first position in which said conduit fluid outlet is located adjacent said opening and a second position in which said conduit fluid outlet is located within the everted portion of said tube relatively remote from said opening, means for producing a sliding seal between said opening and said conduit, and means for supplying fluid to said conduit.

11. The apparatus of claim 10, in which said conduit fluid outlet comprises a nozzle effective to distribute around the axis of said conduit the fluid which escapes therefrom.

12. The apparatus of claim 10, in which in said second position said conduit fluid outlet is located close to the end of said everted tube.

13. The apparatus of claim 10, in which said chamber comprises first and second angularly related portions with said second portion leading to said chamber outlet, said chamber opening being substantially in line with said second chamber portion.

14. The apparatus of claim 10, in which said chamber comprises first and second angularly related portions with said second portion leading to said chamber outlet and said chamber outlet being substantially in line with said second chamber portion, the axis of said conduit being substantially in line with said second chamber portion and the axis of said everted tube.

* * * * *